D. FORNIRASEO.
TONGUE FOR VEHICLES.
APPLICATION FILED JULY 25, 1914.
1,134,835.
Patented Apr. 6, 1915.
2 SHEETS—SHEET 2.
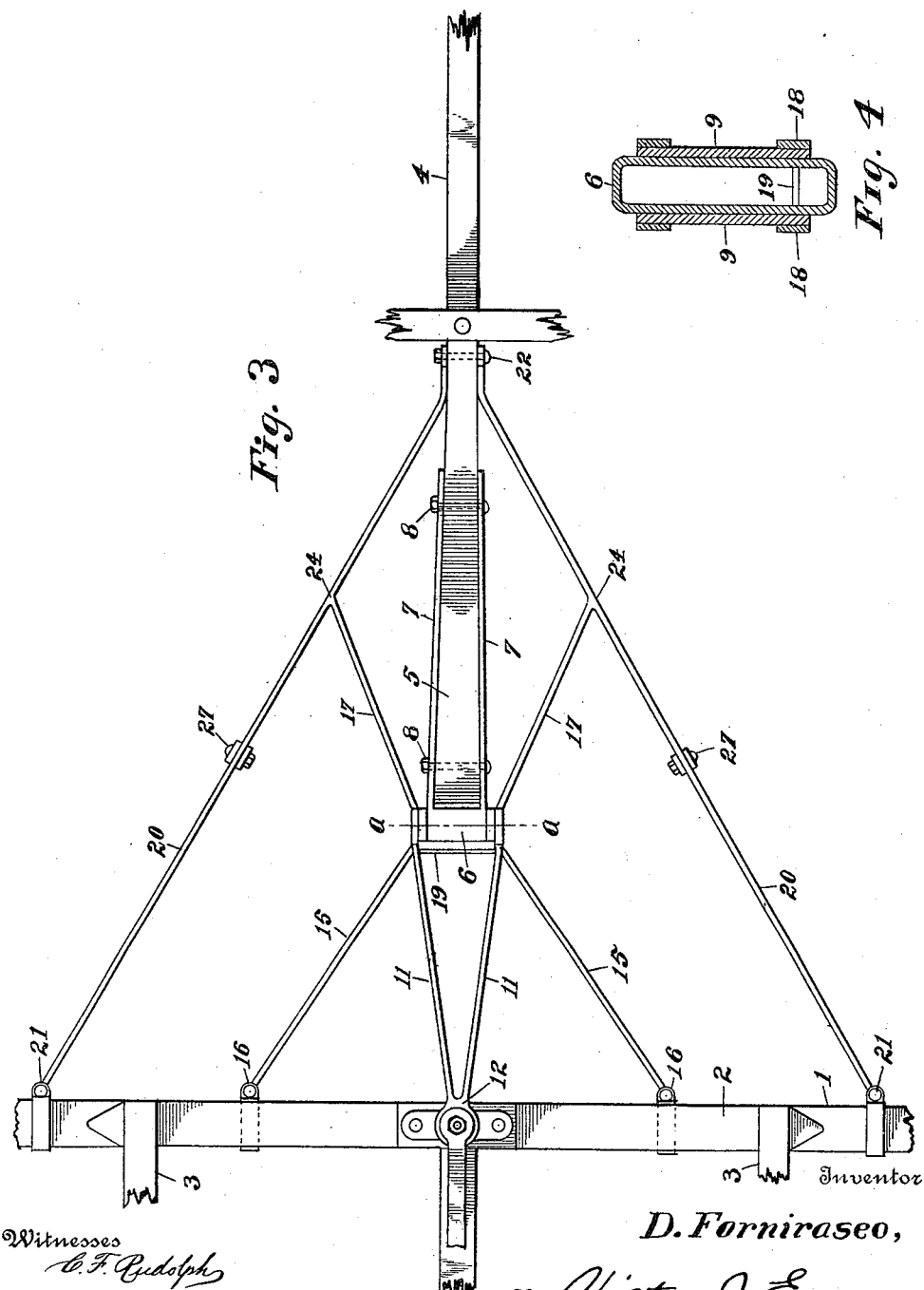

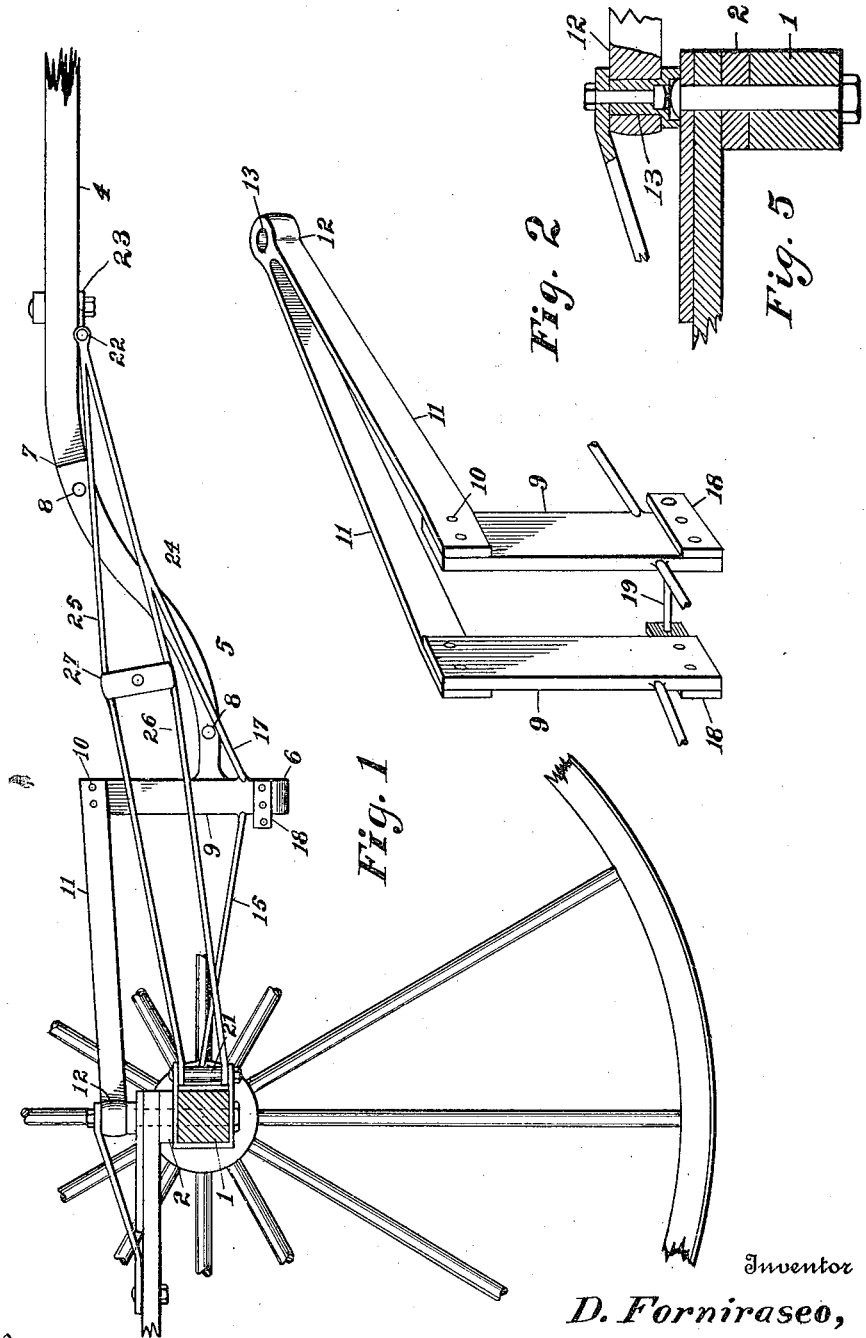

UNITED STATES PATENT OFFICE.

DOMENICO FORNIRASEO, OF KLAMATH FALLS, OREGON.

TONGUE FOR VEHICLES.

1,134,835.　　　　　Specification of Letters Patent.　　Patented Apr. 6, 1915.

Application filed July 25, 1914. Serial No. 853,133.

*To all whom it may concern:*

Be it known that I, DOMENICO FORNIRASEO, a citizen of the United States, residing at Klamath Falls, in the county of Klamath and State of Oregon, have invented new and useful Improvements in Tongues for Vehicles, of which the following is a specification.

This invention relates to improvements in tongues for vehicles and especially with reference to means for attaching a tongue to the front axle of a vehicle so that the necks of the horses are relieved of the weight and pressure of the tongue and so that the tongue may move in a vertical plane but is prevented from moving sidewise, the object of the invention being to effect improvements in the construction of the tongue and to provide improved means for attaching the tongue to the front axle of the vehicle and for bracing the tongue.

The invention consists in the construction, combination and arrangement of devices hereinafter described and claimed.

In the accompanying drawings:—Figure 1 is a side elevation of the front truck of a vehicle provided with a tongue and with tongue attaching means constructed in accordance with my invention, the axle being indicated in section. Fig. 2 is a detail perspective view of the guide and its supporting yoke braces. Fig. 3 is a plan of the front truck, the tongue and tongue attaching means. Fig. 4 is a detail vertical sectional view of the guide and the tongue member therein. Fig. 5 is a detail vertical sectional view through the center of the axle and bolster and showing the king bolt in elevation and also showing the rear end of the yoke in section.

For the purposes of this specification the front axle of a vehicle is indicated at 1, the front bolster at 2 and the reaches at 3. The tongue 4 is here shown as provided with a downwardly curved rear end 5 to which is attached a member 6, the rear end of the tongue being substantially between the upper and lower ends of the member 6 and the latter being vertical when the tongue is in horizontal position. The member 6 is shown as provided on its sides with attaching straps 7 which bear on the opposite sides of the down curved rear end of the tongue and are secured thereto by bolts 8.

The member 6 is arranged between the vertical side members of a guide 9 for vertical movement. The upper ends of the members of the guide are bolted as at 10 to the front ends of the arms 11 of a substantially U-shaped yoke 12 which has an eye 13 at its rear end. This U-shaped yoke works on a boss fastened immediately over and above the king-bolt and bolted to the head-block or bolster. A pair of rearwardly diverging braces 15 have their front ends secured to the side members of the guide and their rear ends secured as at 16 to the axle 1. A pair of forwardly diverging braces 17 also extend from the lower portions of the side members of the guide. A pair of rearwardly extending plates 18 are bolted on the outer sides of the members of the guide and project from the rear sides thereof, said plates being at the lower end of the guide and a bolt rod 19 connects the rear ends of the said plates and extends across the rear side of the guide, at its lower end.

Forwardly converging brace rods 20 have their rear ends secured as by means of clips 21 to the axle 1 near the outer ends of said axle and have their front ends pivotally connected by a bolt 22 to the tongue at a point a suitable distance from the rear end of the tongue, the tongue being provided on the lower side with a pivot clip 23 through which the pivot bolt extends. By thus pivotally mounting the tongue between the front ends of the brace rod 20 the tongue is adapted to move angularly in a vertical plane, the member 6 at the rear end thereof being adapted to move vertically in the guide as hereinbefore stated. The front ends of the brace rods 17 are attached to the brace rods 20 as at 24. Each brace rod 20 is here shown as in the form of a truss, comprising upper and lower members 25—26 and spacer clamps 27 arranged between and spacing the intermediate portions of said upper and lower members. The brace rods 20 take the place of the usual front hounds and not only serve to pivotally support the tongue but also, in coaction with the guide, the yoke, and the braces 15 and 17 firmly brace the tongue against lateral movement while permitting it to move freely in a vertical plane and thus relieve the necks of the horses of weight and stress. The member 6 not only serves in coaction with the guide to guide the tongue for vertical movement, but also serves to counterbalance the tongue so that its weight is not imposed upon the necks of the horses.

Having thus described my invention, I claim:—

In combination with the front axle, front bolster or head-block and king-bolt of a vehicle a guide, a yoke extending rearwardly from the guide and having its rear end arranged on the bolster or head-block and engaged by a boss fastened immediately over and above the king-bolt which said boss is bolted and fastened to the head-block or bolster, forwardly converging brace rods attached to the axle, a tongue pivotally mounted between the front end of the brace-rods and having a member at its rear end arranged to operate vertically in the guide, braces attaching the lower portion of the guide to the axle and braces also connecting the guide to the first named braces.

In testimony whereof I affix my signature in presence of two witnesses.

DOMENICO FORNIRASEO.

Witnesses:
VIRGIL G. DE LAP,
W. H. A. RENNER.

Copies of this patent may be obtained for five cents each, by addressing the "Commissioner of Patents, Washington, D. C."